(12) United States Patent
Kuo et al.

(10) Patent No.: US 10,083,257 B2
(45) Date of Patent: Sep. 25, 2018

(54) METHOD, SYSTEM AND COMPUTER PROGRAM PRODUCT FOR GENERATING SIMULATION SAMPLE

(71) Applicant: TAIWAN SEMICONDUCTOR MANUFACTURING COMPANY, LTD., Hsinchu (TW)

(72) Inventors: Chin-Cheng Kuo, Taoyuan (TW); Wei Min Chan, Sindian (TW); Wei-Yu Hu, Zhubei (TW); Jui-Feng Kuan, Zhubei (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 1072 days.

(21) Appl. No.: 14/464,464

(22) Filed: Aug. 20, 2014

(65) Prior Publication Data

US 2016/0055273 A1    Feb. 25, 2016

(51) Int. Cl.
| | |
|---|---|
| *G06F 17/10* | (2006.01) |
| *G06F 17/50* | (2006.01) |
| *G06F 11/34* | (2006.01) |
| *G06F 11/30* | (2006.01) |

(52) U.S. Cl.
CPC ...... *G06F 17/5009* (2013.01); *G06F 11/3024* (2013.01); *G06F 11/3409* (2013.01); *G06F 17/5081* (2013.01); *G06F 2217/10* (2013.01)

(58) Field of Classification Search
CPC ............ G06F 17/5018; G06F 17/5022; G06F 17/5036
USPC .......................... 703/2, 13, 14; 716/106, 136
See application file for complete search history.

(56) References Cited

U.S. PATENT DOCUMENTS

| | | | | |
|---|---|---|---|---|
| 7,827,018 | B2 * | 11/2010 | Adams ............. | G11C 29/56008 703/14 |
| 8,479,130 | B1 * | 7/2013 | Zhang ................. | G06F 17/5045 716/106 |
| 8,756,559 | B2 * | 6/2014 | Shroff ................. | G06F 17/5009 716/106 |
| 2013/0246986 | A1 | 9/2013 | Kuo et al. | |
| 2015/0089463 | A1 | 3/2015 | Kuo et al. | |

* cited by examiner

*Primary Examiner* — Andy Ho
(74) *Attorney, Agent, or Firm* — Hauptman Ham, LLP (57) ABSTRACT

A method includes determining a sampling region in a sample space, generating samples in the sampling region without generating samples outside the sampling region, and simulating a performance of a device using the generated samples as input data. The sample space is defined by a plurality of variables associated with the device. Values of the plurality of variables in the sampling region having lower probabilities to meet a specification of the device than values of the plurality of variables outside the sampling region. The method is performed at least partially by at least one processor.

20 Claims, 7 Drawing Sheets

METHOD, SYSTEM AND COMPUTER PROGRAM PRODUCT FOR GENERATING SIMULATION SAMPLE

BACKGROUND

The recent trend in miniaturizing integrated circuits (ICs) has resulted in smaller devices which consume less power yet provide more functionality at higher speeds. The miniaturization process has also resulted in stricter design and manufacturing specifications. Various electronic design automation (EDA) processes are developed to generate, optimize and verify designs for semiconductor devices while ensuring that the design and manufacturing specifications are met.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In some embodiments, simulation samples are generated, with constraints, to be concentrated in a sampling region of a sample space. Compared to other approaches where simulation samples are generated over the whole sample space and/or without constraints, one or more embodiments achieve one or more effects including, but not limited to, lower simulation time and/or cost, enhanced stability, and higher accuracy, without an increase in the number of simulation samples.

In the following description, one or more simulation sample generation methodologies in accordance with some embodiments are described in the context of a manufacturing process of a semiconductor device. Other arrangements are within the scope of various embodiments. In an example, one or more simulation sample generation methodologies in accordance with some embodiments are applicable to a manufacturing process of a device other than a semiconductor device. In another example, one or more simulation sample generation methodologies in accordance with some embodiments are applicable to one or more aspects other than the manufacture of a device. In a further example, one or more simulation sample generation methodologies in accordance with some embodiments are applicable to various simulation techniques where randomly generated samples are used as input data for simulations. An example simulation technique includes a Monte Carlo (MC) simulation. Other simulation techniques are within the scope of various embodiments.

Figure 1:
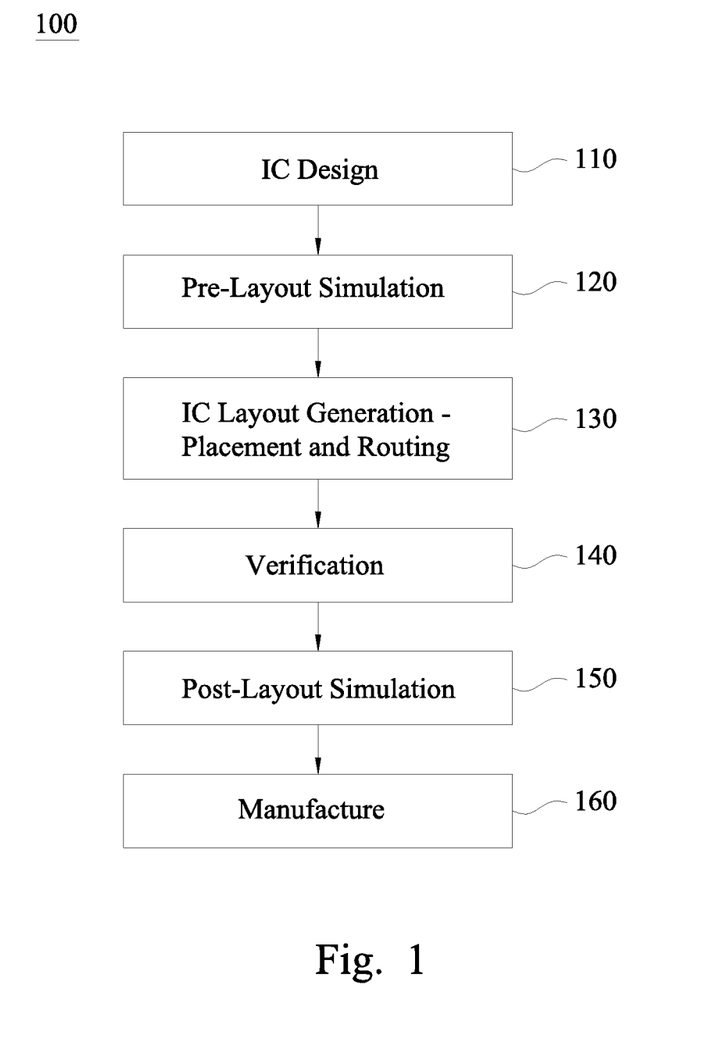
FIG. 1 is a functional flow chart of at least a portion of a semiconductor device design process, in accordance with some embodiments.

FIG. 1 is a functional flow chart of at least a portion of a semiconductor device design process 100, in accordance with some embodiments. The design process 100 utilizes one or more EDA tools for generating, optimizing and verifying a design of a semiconductor device before manufacturing the semiconductor device. The EDA tools, in some embodiments, comprise one or more sets of executable instructions for execution by a processor or controller or a programmed computer to perform the indicated functionality. In some embodiments, the semiconductor device includes a plurality of interconnected circuit elements. A circuit element includes one or more active elements and/or one or more passive elements. Examples of active elements include, but are not limited to, transistors and diodes. Examples of transistors include, but are not limited to, metal oxide semiconductor field effect transistors (MOSFET), complementary metal oxide semiconductor (CMOS) transistors, bipolar junction transistors (BJT), high voltage transistors, high frequency transistors, p-channel and/or n-channel field effect transistors (PFETs/NFETs), etc.), FinFETs, planar MOS transistors with raised source/drains. Examples of passive elements include, but are not limited to, capacitors, inductors, fuses, and resistors. Interconnects within or among the circuit elements include, but are not limited to, vias, conductive pads, conductive patterns, conductive redistribution lines (RDLs).

At operation 110, a design of a semiconductor device is provided by a circuit designer. In some embodiments, the design of the semiconductor device includes a schematic, i.e., an electrical diagram, of the semiconductor device. In some embodiments, the schematic is generated or provided in the form of a schematic netlist. In some embodiments, the circuit designer uses a process design kit (PDK) to develop the design of the semiconductor device. The PDK includes a variety of automated design tools, such as EDA tools, to assist the circuit designer in the design process. In at least one embodiment, the PDK is provided by a foundry to the circuit designer.

At operation 120, a pre-layout simulation is performed on the design to determine whether the design meets a predetermined specification. When the design does not meet the predetermined specification, the semiconductor device is redesigned. For example, a modification is made, by the circuit designer using the PDK, to the design to change a configuration of the semiconductor device to meet the predetermined specification, and the process repeats the pre-layout simulation at operation 120. When the design meets the predetermined specification, the process proceeds to operation 130.

At operation 130, a layout of the semiconductor device is generated based on the design. The layout includes the physical positions of various circuit elements of the semiconductor device as well as the physical positions of various interconnects within and among the circuit elements. In some embodiments, the layout is generated by a placement and routing tool.

At operation 140, one or more verifications and/or checks are performed. For example, a layout-versus-schematic (LVS) check is performed to ensure that the generated layout corresponds to the design. For another example, a design rule check (DRC) is performed to ensure that the layout satisfies certain manufacturing design rules, i.e., to ensure that the semiconductor device can be manufactured. When one of the checks fails, correction is made to at least one of the layout or the design by returning the process to operation 110 and/or operation 130.

At operation 150, a post-layout simulation is performed to determine whether the layout meets a predetermined specification. When the simulation result indicates that the layout does not meet the predetermined specification, e.g., when there are undesirable time delays, correction is made to at least one of the layout or the design by returning the process to operation 110 and/or operation 130. Otherwise, the layout is passed to manufacture at operation 160. In some embodiments, one or more of the above-described operations are omitted. For example, the pre-layout simulation at operation 120 or the post-layout simulation at operation 150 is omitted in one or more embodiments. In some embodiments, one or more of the above-described operations are performed in an order different from the described order. For example, in at least one embodiment, one or more simulations is/are performed during the IC layout generation at operation 130.

In some embodiments, one or more simulations of the semiconductor device design process 100, including, but not limited to, the pre-layout simulation at operation 120 and/or the post-layout simulation at operation 150, comprise one or more MC simulations. Other simulation techniques are within the scope of various embodiments. In an example MC simulation, samples are randomly generated. For each generated sample, a circuit simulation is performed using the generated sample as input data. When the circuit simulation indicates that the sample meets a specification of the semiconductor device, the sample is considered feasible. A yield of the semiconductor device is estimated as a percentage of feasible samples among all generated samples. When the estimated yield does not meet a predetermined yield value, a modification is made to the design or configuration of the semiconductor device and the MC simulation is repeated. In some situations, a large number (e.g., millions to billions) of samples is generated to achieve an intended accuracy. As the intended accuracy increases, the number of generated samples is also increased which, in turn, increases the simulation cost and/or time.

To reduce the number of generated samples while achieving the same or better intended accuracy and/or to achieve an increased accuracy without increasing the number of generated samples, simulation sample generation methodologies in accordance with some embodiments generate samples with sampling constraints, so that the generated samples are concentrated in a sampling region where a failure to meet the specification is most likely observed. One or more such simulation sample generation methodologies for identifying a sampling region in accordance with some embodiments are described with reference to FIGS. 2-4, 5A and 5B.

Figure 2:
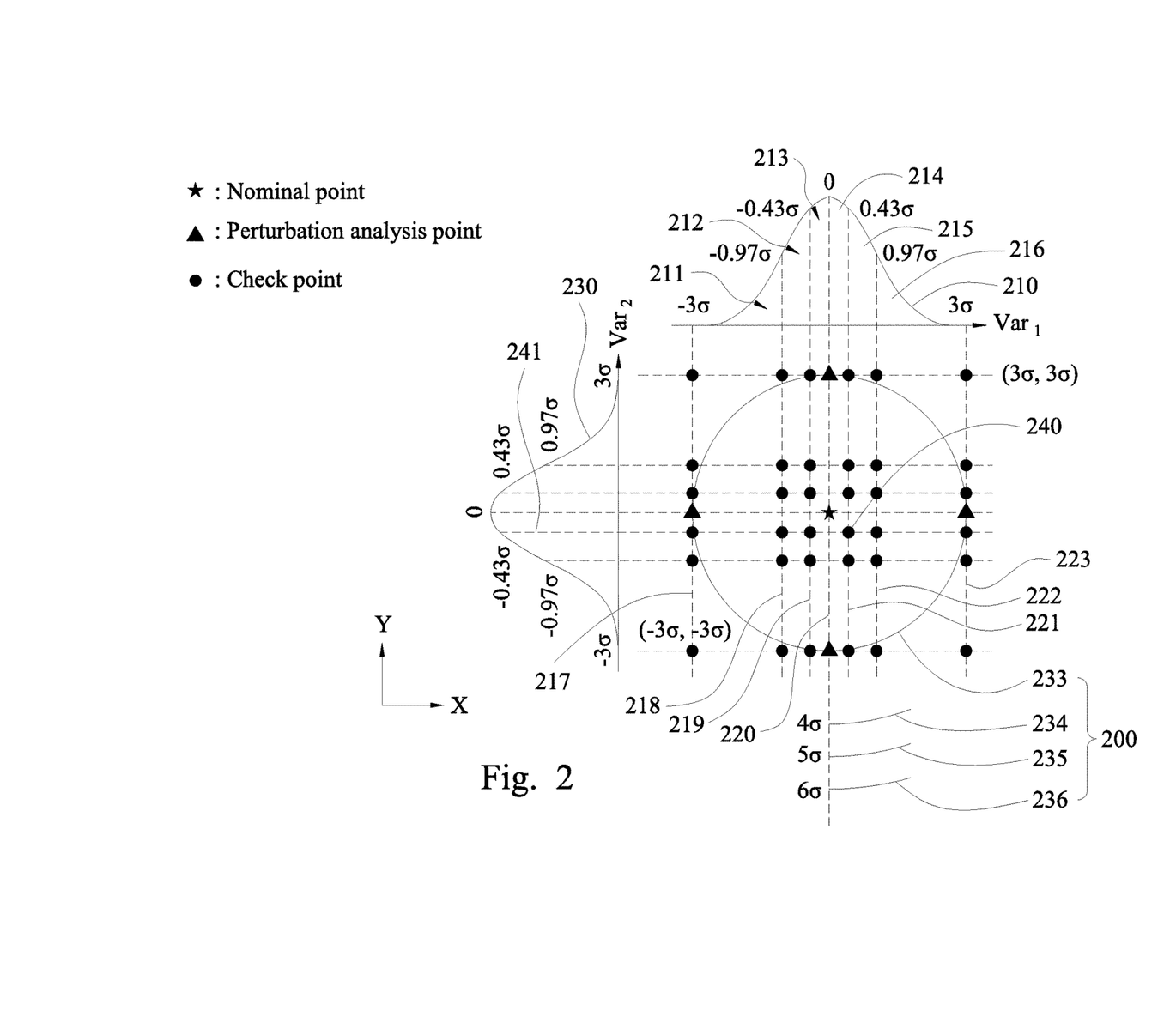
FIGS. 2-4, 5A and 5B are diagrams explaining one or more simulation sample generation methodologies, in accordance with some embodiments.

FIG. 2 is a diagram for explaining a sample space, a bin division scheme and check points, in accordance with some embodiments. As illustrated in FIG. 2, a sample space 200 is defined by a plurality of variables. For example, two variables $Var_1$ and $Var_2$ define the sample space 200 in FIG. 2 as a 2-dimensional sample space in an X-Y plane. However, other numbers of variables are within the scope of various embodiments. For example, n variables define the sample space 200 as an n-dimensional sample space, where n is a positive integer. In at least one embodiment involving the design and/or manufacture of a semiconductor device, n is from 30 to 1000.

In some embodiments, the variables defining the sample space 200 are associated with a device, a performance of which is to be simulated. In some embodiments, the variables are associated with a manufacturing process of a device. In some embodiments, the variables include variables of a manufacturing process of a semiconductor device. In some embodiments, the variables defining the sample space 200 include one or more variables which are not controllable by the circuit designer and which potentially affect a performance or yield of the semiconductor device. Examples of variables which are not controllable by the circuit designer include, but are not limited to, global process variations, local process variations, environmental variations, parasitic parameters, and aging effects. Examples of environmental variables include, but are not limited to, temperature and load variations or conditions.

Variations of the variables defining the sample space 200 are represented, in some embodiments, by a Gaussian distribution. A Gaussian distribution has a mean value $\mu$ and a standard deviation $\sigma$. A variable tends to cluster around the mean value $\mu$ which means the probability is highest at the mean value $\mu$. The probability is decreased away from the cluster around the mean value $\mu$. For example, variations of $Var_1$ in FIG. 2 are represented by a probability distribution 210. The probability distribution 210 in an example configuration illustrated in FIG. 2 is a standard normal distribution with $\mu=0$ and $\sigma=1$. $Var_1$ tends to cluster around the mean value $\mu=0$ which has the highest probability. The probability of $Var_1$ is decreased away from the cluster around the mean value $\mu=0$. The described values of $\mu$ and/or $\sigma$ are examples. Other values of $\mu$ and/or $\sigma$ are within the scope of various embodiments.

The probability distribution 210 is divided into a number of areas or bins. In an example configuration illustrated in FIG. 2, the probability distribution 210 is divided into six bins 211-216. The bins 211-216 of the probability distribution 210 have corresponding boundaries 217-223. For example, the bin 211 has the boundaries 217, 218. Other numbers of divided bins per probability distribution are within the scope of various embodiments. For example, the probability distribution 210 is divided into four bins in at least one embodiment. As the number of bins increases, the accuracy increases but the processing time and/or resource also increase. The number of bins divided from a probability distribution is determined, in at least one embodiment, with considerations of various factors including, but not limited to, accuracy, processing time and/or cost, application.

In an example configuration illustrated in FIG. 2, the bins 211-216 are divided such that the probabilities of the bins 211-216 are the same. In particular, the probability of the entire probability distribution 210 is 1 and the probability distribution 210 is divided into six bins of the same (or equal) probability. As a result, the probability of each of the bins 211-216 is $\frac{1}{6} = 16.67\%$. When the probability distribution 210 is divided into six bins 211-216 having the same probability, the values of $Var_1$ on the boundaries 217-223 are correspondingly $-3\sigma$, $-0.97\sigma$, $-0.43\sigma$, $0$, $0.43\sigma$, $0.97\sigma$ and $3\sigma$. Values of $Var_1$ in each of the bins 211-216 are given the same probability of the corresponding bin. For example, values of $Var_1$ between $-0.97\sigma$ and $-0.43\sigma$ have the same probability of 16.67%. When the probability distribution 210 is divided into four bins having the same probability, the values of $Var_1$ on the corresponding boundaries are $-3\sigma$, $-0.68\sigma$, 0, $0.68\sigma$ and $3\sigma$. The described bin division scheme of the probability distribution 210 to include divided bins having the same probability is an example. Other bin division schemes are within the scope of various embodiments. For example, an alternative bin division scheme, where the divided bins have the same width, is described with respect to FIG. 3.

Variations of $Var_2$ are represented by a probability distribution 230. The probability distribution 230 in an example configuration illustrate in FIG. 2 is also a standard normal distribution and is divided into six bins having the same probability as described with respect to the probability distribution 210. Other arrangements are within the scope of various embodiments. For example, in at least one embodiment, the probability distribution 230 is divided into a number of bins different from that of the probability distribution 210 and/or based on a bin division scheme different from that of the probability distribution 210. In some embodiments, one or more values of $\mu$ and/or $\sigma$ of one variable (e.g., Van) is/are different from those of $\mu$ and/or $\sigma$ of another variable (e.g., $Var_2$).

In an example configuration illustrated in FIG. 2, the sample space 200 is defined as the region within a $3\sigma$ contour 233. The $3\sigma$ contour 233 is a circle having a center at a nominal point (designated with the star symbol in FIG. 2) and a radius of $3\sigma$. The nominal point corresponds to the zero values of $Var_1$ and $Var_2$. The radius of the $3\sigma$ contour 233 corresponds to the farthest distance from the outermost boundaries (e.g., boundaries 217 and 223 of the probability distribution 210) to the nominal point. Other configurations of the sample space 200 are within the scope of various embodiments. In general, the sample space 200 corresponds to a $k\sigma$ contour, where k is a positive integer. For example, when k=4, the sample space 200 corresponds to a $4\sigma$ contour 234; when k=5, the sample space 200 corresponds to a $5\sigma$ contour 235; and when k=6, the sample space 200 corresponds to a $6\sigma$ contour 236. As the value of k increases, the accuracy increases but the processing time and/or resource also increase. The value of k is determined, in at least one embodiment, with considerations of various factors including, but not limited to, accuracy, processing time and/or cost, application.

A plurality of check points (designated with the circle symbols in FIG. 2) are selected to be at intersections of boundaries of the divided bins of the probability distributions of the variables. For example, a check point 240 is identified as the intersection between the boundary 221 corresponding to the value $0.43\sigma$ of $Var_1$, and a boundary 241 corresponding to the value $-0.43\sigma$ of $Var_2$. In an example configuration illustrated in FIG. 2, intersections located along the center boundaries (e.g., the boundary 220) corresponding to the zero values of $Var_1$ and $Var_2$ are not selected as check points. Intersections (designated with the triangle symbols in FIG. 2) of the center boundaries (e.g., the boundary 220) corresponding to the zero values of $Var_1$ and $Var_2$ and the outermost boundaries (e.g., the boundaries 217, 223) corresponding to the values $-3\sigma$ and $3\sigma$ of $Var_1$ and $Var_2$ are used as perturbation analysis points as described herein. Scores of the check points are determined as described herein to identify a sampling region in accordance with some embodiments.

Figure 3:
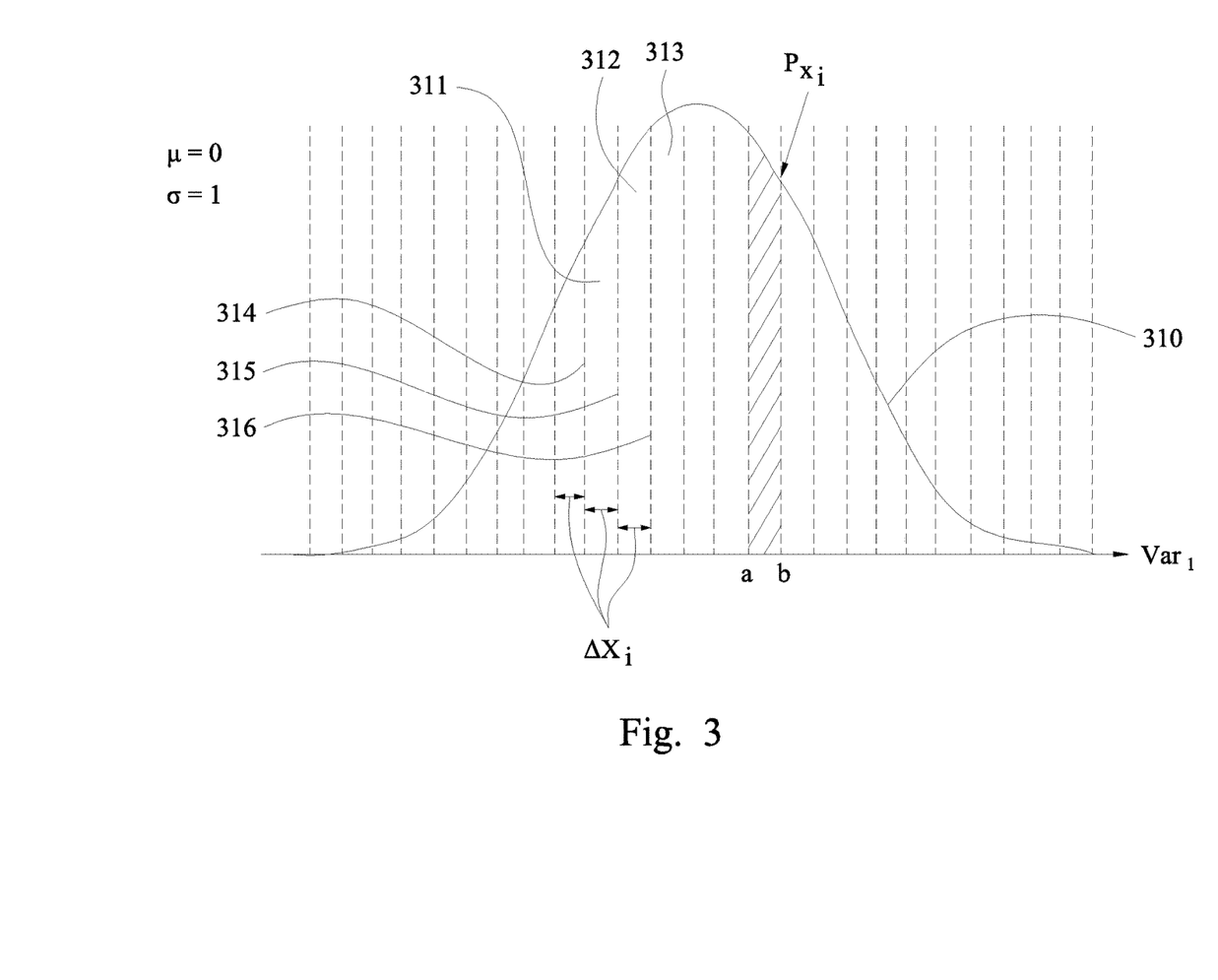

FIG. 3 is a diagram for explaining a bin division scheme, in accordance with some embodiments. As illustrated in FIG. 3, a probability distribution 310 of an $i^{th}$ variable $Var_i$ (i=1...n) is divided into a plurality of bins, three of which, i.e., bins 311, 312, and 313, are illustrated as examples in FIG. 3. The divided bins of the probability distribution 310 have the same width. For example, the width of the bin 311 is a difference between values of $Var_i$ corresponding to boundaries 314, 315 of the bin 311. The width of the bin 312 is a difference between values of $Var_i$ corresponding to boundaries 315, 316 of the bin 312. The widths of the bins 311 and 312 are the same, i.e., $\Delta X_i$. While the widths of the bins 311-313 are the same, their probabilities are different. For example, the probability of the bin 313 is greater than the probability of the bin 312 which, in turn, is greater than the probability of the bin 311. In general, a probability $Px_i$ of a point $x_i$ (and the corresponding bin) located between values a and b of $Var_i$ is determined by the following equation:

$$P_{x_i} = \frac{1}{\sqrt{2\pi}} \int_{-\infty}^{b} e^{-t^2/2} dt - \frac{1}{\sqrt{2\pi}} \int_{-\infty}^{a} e^{-t^2/2} dt = \frac{1}{\sqrt{2\pi}} \int_{a}^{b} e^{-t^2/2} dt \quad (1)$$

where $a \le x_i < b$.

Other techniques for determining probabilities of in various bins of the probability distribution 310 are within the scope of various embodiments. For example, probabilities and boundaries of the corresponding bins of the probability distribution 310 are stored in a look-up table. The determined probabilities are used to calculate the scores of the check points as described herein.

In some embodiments, to determine the scores of the check points, weight values of the variables are determined. For example, the following equations are used in at least one embodiment to determine normalized weight value of each of the variables:

$$w_i^{\pm} = \frac{Perf_{(x_i = \mu \pm k\sigma)} - Perf_{(x_i = \mu)}}{\pm k\sigma} \quad (2)$$

$$w_{i\_n}^{\pm} = \frac{w_i^{\pm}}{\max(|w_i^{\pm}|)} \quad (3)$$

where $x_i$ is a value of an $i^{th}$ variable of the plurality of variables, $\sigma$ is a standard deviation of the probability distribution of the $i^{th}$ variable, $\mu$ is a mean value of the probability distribution of the $i^{th}$ variable, k is a positive integer, Perf is a performance function associated with the $i^{th}$ variable, $w_i^{\pm}$ is a weight value of the $i^{th}$ variable before normalization, and $w_{i\_n}^{\pm}$ is a normalized weight value of the $i^{th}$ variable, $w_{i\_n}^{-}$ corresponds to $x_i < 0$, $w_{i\_n}^{+}$ corresponds to $x_i \ge 0$.

In at least one embodiment, k=3. In some embodiments, the performance function Perf represents a model of at least a portion of the semiconductor device. In some embodiments, the values $Perf_{(x_i = \mu \pm k\sigma)}$ and $Perf_{(x_i = \mu)}$ are obtained by a perturbation analysis in which a simulation of at least a portion of the semiconductor device is performed at the perturbation analysis points $x_i = \mu \pm k\sigma$ and $x_i = \mu$. The described calculation of the weight values and/or the normalized weight values of the variables is an example. Other arrangements for determining weight values are within the scope of various embodiments.

In some embodiments, the score of each of the check points are determined based on one or more of the weight values of the variables, values of the variables at the check point, and probabilities of the values of the variables at the check point. For example, the following equations are used in at least one embodiment to determine the score of each of the check points:

$$\text{score}_j = P_j \bigg/ \left( \sum_{i=1}^{n} x_{ij} \cdot w_{i\_n}^{\pm} \right) \quad (4)$$

$$P_j = \prod_{i=1}^{n} P_{x_{ij}} \quad (5)$$

$$P_{x_{ij}} = P(a < x_{ij} \cdot w_{i\_n}^{\pm} < b) \quad (6)$$

where $\text{score}_j$ is the score of a $j^{th}$ check point among the check points, n is a number of the variables, $x_{ij}$ is a difference between a value of the $i^{th}$ variable ($Var_i$) at the $j^{th}$ check point and the mean value μ of the probability distribution of the $i^{th}$ variable, $P_j$ is a probability of the $j^{th}$ check point with respect to the variables, $Px_{ij}$ is a probability of the $j^{th}$ check point with respect to the $i^{th}$ variable, P is a probability distribution function describing the probability distribution of the $i^{th}$ variable, and a and b are values of the $i^{th}$ variable at the boundaries of the divided area corresponding to $x_{ij} * w_{i\_n}^{\pm}$.

In some embodiments, the probability distribution function P is represented by the equation (1) described with respect to FIG. 3. In some embodiments, when the probability distribution of $Var_i$ is divided into bins having the same probability, the probability $Px_{ij}$ is the same at all values of $Var_i$.

For example, the score of the check point 240 in FIG. 2 for two variables (n=2) is calculated in accordance with some embodiments as follows.

For $Var_1$, $x_{1j}$=0.43σ which corresponds to the boundary 221 of the probability distribution 210 of $Var_1$, $Px_{1j}$=16.67%=0.1667 which is the same for all values of $Var_1$, and $w_{i\_n}^{\pm}$ is $w_{1\_n}^{+}$ for i=1 and $x_{1j}$=0.43σ>0.

For $Var_2$, $x_{2j}$=−0.43σ which corresponds to the boundary 241 of the probability distribution 230 of $Var_2$, and $Px_{2j}$=16.67%=0.1667 which is the same for all values of $Var_2$, and $w_{i\_n}^{\pm}$ is $w_{2\_n}^{-}$ for i=2 and $x_{2j}$=−0.43σ<0.

$$P_j = \prod_{i=1}^{n} P_{x_{ij}} = Px_{1j} * Px_{2j} = 0.1667 * 0.1667 = 0.02779.$$

$$\sum_{i=1}^{n} x_{ij} \cdot w_{i\_n}^{\pm} = x_{1j} * w_{1\_n}^{+} + x_{2j} * w_{2\_n}^{-} = 0.43\sigma * w_{1\_n}^{+} + (-0.43\sigma) * w_{2\_n}^{-}.$$

The score of the check point 240 in FIG. 2 is 0.02779/(0.43σ*($w_{1\_n}^{+}$−$w_{2\_n}^{-}$)).

The described determination of the scores of the check points is an example. Other arrangements for determining the scores of the check points are within the scope of various embodiments. An example alternative method is described in U.S. provisional application No. 61/881,091, filed Sep. 23, 2013, the disclosure of which is incorporated by reference herein in its entirety.

In some embodiments, the scores of the check points are used to determine sampling constraints for generation of simulation samples. The lower the score of a check point, the lower the likelihood that values of the variables at, or in a vicinity of, the check point will meet the specification of the semiconductor device. In at least one embodiment, the scores are sorted in a descending or acceding order. The check points having the corresponding scores lower than a predetermined threshold are identified as low score check points, i.e., locations with low probabilities that the specification of the semiconductor device will be met. In at least one embodiment, the predetermined threshold is a predetermined score value. In at least one embodiment, the predetermined threshold is a predetermined percentile value. For example, for 1000 check points and with a predetermined percentile value of 99, the worse 1 percent, i.e., 10 check points, with the lowest scores, are identified as low score check points, i.e., locations with low probabilities of the specification being met.

Figure 4:
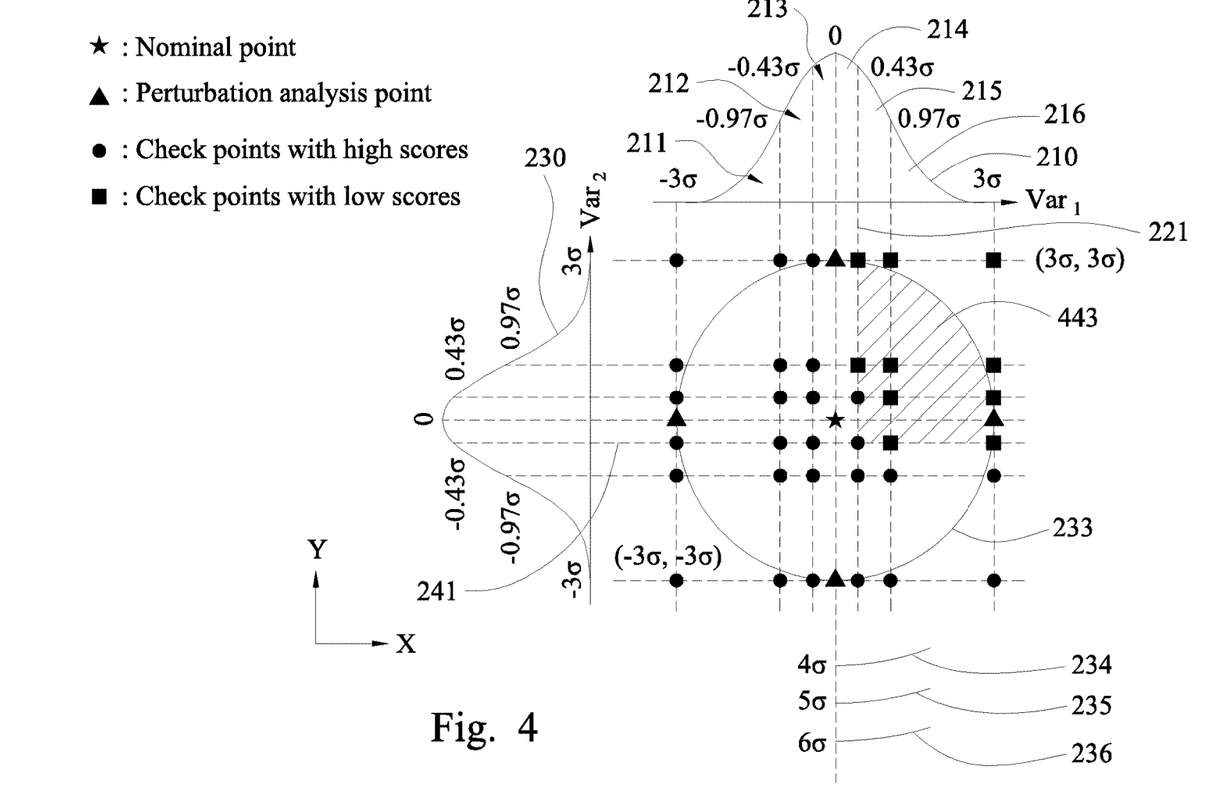
Figure 5A:
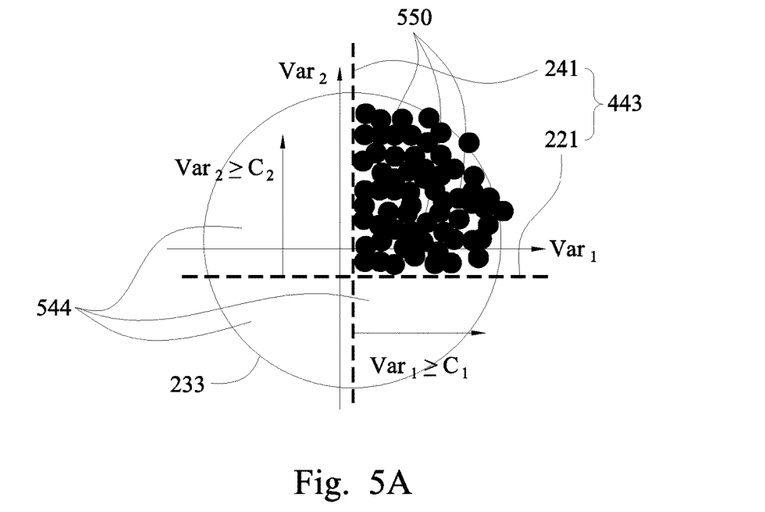

FIG. 4 is a diagram similar to FIG. 2, and shows various check points identified as low score check points (designated with the square symbols) based on the corresponding scores. The low score check points define sampling constraints for simulation sample generation. For example, in an example configuration illustrated in FIG. 4, the low score check points all have values of $Var_1$ equal to or greater than 0.43σ. As a result, 0.43σ is determined as a sampling constraint $C_1$ for $Var_1$. In a subsequent simulation sample generation, samples will be generated to satisfy this sampling constraint $C_1$, i.e., to have values of Van equal to or greater than $C_1$=0.43σ. Further, in an example configuration illustrated in FIG. 4, the low score check points all have values of $Var_2$ equal to or greater than −0.43σ. As a result, −0.43σ is determined as a sampling constraint $C_2$ for $Var_2$. In a subsequent simulation sample generation, samples will be generated to satisfy this sampling constraint $C_2$, i.e., to have values of $Var_2$ equal to or greater than $C_2$=−0.43σ. The sampling constraints $Var_1 \geq C_1$ and $Var_2 \geq C_2$ defining corresponding boundaries 221, 241 of a sampling region 443 in the sample space which, in an example configuration illustrated in FIG. 4, comprises the 3σ contour 233. As described herein with respect to FIGS. 5A-5B, values of the variables in the sampling region 443 have lower probabilities to meet the specification of the semiconductor device than values of the variables outside the sampling region 443, i.e., in the remaining region of the sample space (i.e., the 3σ contour) 233. The sampling region 443 includes simulation targets for extracting statistical corners, and simulation samples are generated in the sampling region 443 in accordance with some embodiments FIG. 5A is a diagram showing simulation sample generation in a sampling region in accordance with some embodiments. For example, simulation samples 550 are generated in the sampling region 443, without being generated outside the sampling region 443, i.e., without being generated in a remaining region 544 of the sample space 233. One or more simulation sample generation methodologies in accordance with some embodiments are not limited to a particular sampling algorithm. Example sampling algorithms for generating simulation samples 550 include, but are not limited to, pseudo-random sampling algorithms, variance reduction techniques, low discrepancy sequences and the like.

Figure 5B:
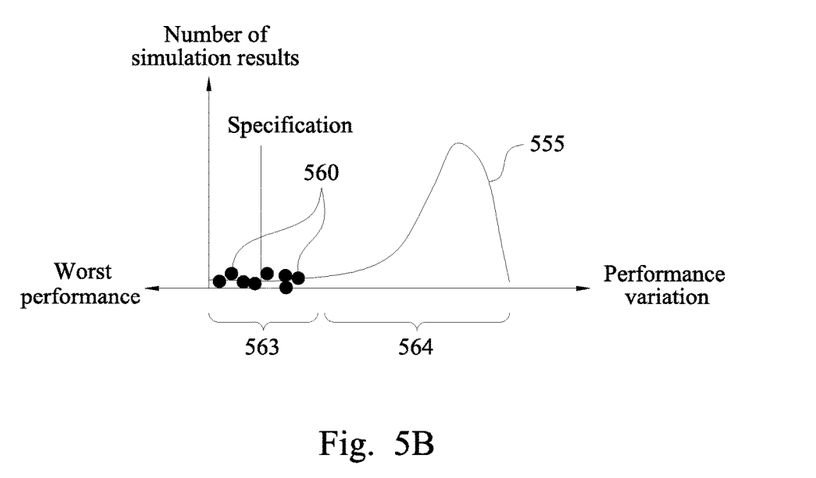

FIG. 5B is a graph showing a distribution 555 of simulation results corresponding to generated simulation samples. In the distribution 555, the horizontal axis indicates simulated performance variation, and the vertical axis indicates the number of simulation results having a particular performance variation value. Simulation results 560 in FIG. 5B correspond to the simulation samples 550 in the sampling region 443 in FIG. 5A. The simulation results 560 tend to concentrate in a worst-case performance region 563 around the specification. In other approaches where simulation samples are also generated in the remaining region 544 of the sample space 233 in FIG. 5A, corresponding simulation results would tend to concentrate in a remaining region 564 of the distribution 555 in FIG. 5B. In other words, values of the variables in the sampling region 443 have lower probabilities to meet the specification of the semiconductor device than values of the variables outside the sampling region 443, i.e., in the remaining region 544 of the sample space 233.

In FIG. 5B, simulation results 560 corresponding to performance variation values smaller than (i.e., failing to meet) the specification indicate failed samples. A ratio of the number of failed samples to a total number of samples is used to estimate the yield of the semiconductor device in one or more embodiments. In some situations, a low number of failed samples affects the accuracy of the estimated yield and/or statistical corner extraction. To locate more failed samples, other approaches increase the number of generated samples with an associated increase in simulation time and cost.

One or more simulation sample generation methodologies in accordance with some embodiments make it possible to increase the number of failed samples without increasing the number of generated samples. An example is detailed in Table 1.

TABLE 1

| | | Bin Division Scheme (6 bins) | |
|---|---|---|---|
| Critical variables | Weight values | Sampling constraints for determining a sampling region | number of selected bins |
| PG2_var1 | −1 | ≥0.97σ | 1 |
| PU2_var1 | 0.72 | ≤−0.97σ | 1 |
| PG1_var1 | −0.45. | ≥0.43σ | 2 |
| PD1_var1 | 0.39 | ≤0.43σ | 4 |
| PG2_var2 | 0.14 | Entire Gaussian probability distribution - no sampling constraint | 6 |

In the example in Table 1, five variables PG2_var1, PU2_var1, PG1_var1, PD1_var1 and PG2_var2 are considered for determining a sampling region. The variables' corresponding weight values, sampling constraints and numbers of selected bins are given in Table 1. In this example, the probability distribution of each of the variables is divided into six bins. In the example, the higher the absolute value of the weight value (hereinafter referred to as "absolute weight value") of a variable, the greater impact the variable has on a probability of a sample meeting the specification. Variables having the absolute weight values greater than a predetermined threshold are considered critical. In the example, the five variables are considered critical based on the corresponding absolute weight values. The example further includes other, non-critical variables with lower absolute weight values than shown in Table 1. In at least one embodiment, non-critical variables are not considered for determining a sampling region, and simulation samples are generated across the sample space with respect to the non-critical variables.

A ratio of concentration of samples in the sampling region is determined in accordance with some embodiments with the following equation:

$$\text{ratio} = \frac{NumberofTotal \text{ bins}}{NumberofSelected \text{ bins}} = \frac{6^5}{1 \times 1 \times 2 \times 4 \times 6} = 162 \quad (7)$$

where Number of Total bins is the a total number of all bins for all variables, and Number of Selected bins is a total number of the bins corresponding the sampling region. In in at least one embodiment, this ratio is determined simply by using the equation (7), without determining, e.g., by integration, the actual areas of the sampling region and the sample space. This increases the processing speed in at least one embodiment.

The ratio of 162 indicates that the simulation sample generation methodologies in accordance with some embodiments in this particular example provide an increase of 162 times in coverage. For example, assuming that, in this example, ten (10) billion samples are generated. The coverage provided by this example is equivalent to that provided by other approaches with 1620 billion samples. At a predetermined yield value of 99.9999999013%, the acceptable number of failed samples for meeting the predetermined yield value is (1−99.9999999013%)*10*10⁹=9.87, in accordance with other approaches. In other words, out of 10 billion samples, only 9 failed samples are permitted by other approaches when the predetermined yield value of 99.9999999013% is to be met. Such a low acceptable number (i.e., 9) of failed samples compared to a much larger number of generated samples (i.e., ten billion) potentially involves a risk of yield estimation inaccuracy.

Because the simulation sample generation methodologies in accordance with some embodiments in this particular example provide an increase of 162 times in coverage equivalent to 1620 billion samples, an acceptable number of failed samples in this particular example is not greater than (1−99.9999999013%)*1620*10⁹=1598.94, i.e., 1598. Given the same number (10 billion) of generated samples and the same predetermined yield value of 99.9999999013%, this particular example provides a much higher acceptable number (1598) of failed samples, compared with 9 samples as in the other approaches. Accordingly, accuracy is increased in one or more embodiments. Given the sufficient number of failed samples in accordance with some embodiments, a statistical corner extraction and/or another analysis is unlikely to involve multiple simulation iterations which further speeds-up the processing time.

In at least one embodiment, the acceptable number of failed samples (also referred to herein as fail rate) is further increased by increasing the number of divided bins for one or more variables, without increasing the number of generated samples. In an example, when the probability distribution of each of five variables is divided into four bins, the fail rate is increased 76 times compared to other approaches. When the probability distribution of each of five variables is divided into six bins, the fail rate is increased 116 times compared to other approaches.

In one or more simulation sample generation methodologies in accordance with some embodiments, the simulation samples are concentrated at locations where the specification of the semiconductor device is likely violated, without spending simulation time and/or cost outside the sampling region where the specification of the semiconductor device is likely met. The concentration of simulation samples in a sampling region, instead of spreading simulation samples all over the sample space as in other approaches, permit one or more embodiments to improve one or more of accuracy, time, cost, stability, MC error of the simulation.

One or more simulation sample generation methodologies in accordance with some embodiments are independent of circuit structures or configurations, and/or independent of sampling algorithms. One or more simulation sample generation methodologies in accordance with some embodiments are applicable to advanced process nodes, such as N10 and beyond, and/or applicable to high sigma analyses. One or more simulation sample generation methodologies in accordance with some embodiments further speed up the design and/or manufacturing processes, especially the design-for-yield flow.

Figure 6:
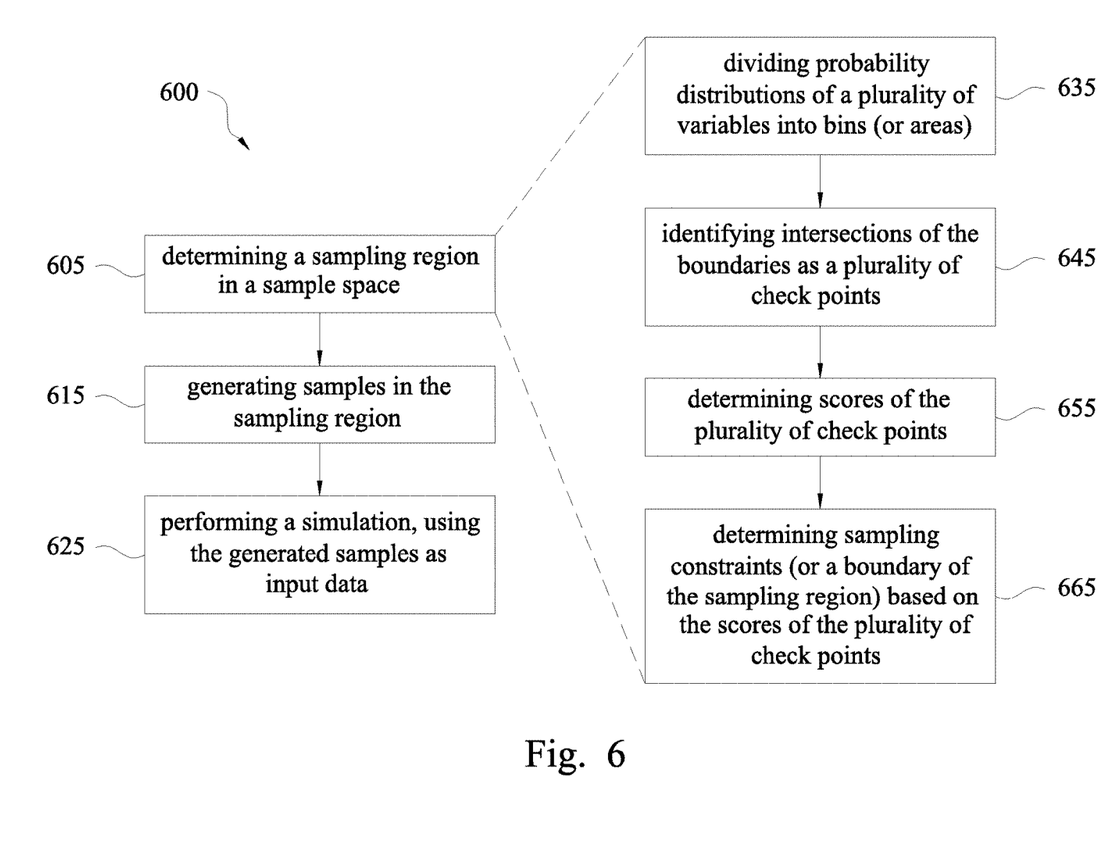
FIG. 6 is a flow chart of a method in accordance with some embodiments.

FIG. 6 is a flow chart of a method 600 in accordance with some embodiments. In at least one embodiment, the method 600 is performed, at least partially, by at least one processor or computer system as described herein.

At operation 605, a sampling region is determined in a sample space. In in at least one embodiment, the sample space is defined by a plurality of variables associated with a device, and values of the variables in the sampling region have lower probabilities to meet a specification of the device than values of the plurality of variables outside the sampling region. For example, a sampling region 443 is determined in a sample space 233 as described with respect to FIGS. 2-4.

At operation 615, samples are generated in the sampling region. In at least one embodiment, samples are not generated outside the sampling region, by, e.g., using one or more sampling constraints. For example, simulation samples 550 are generated in the sampling region 443 as described with respect to FIG. 5A.

At operation 625, a simulation is performed, using the generated samples as input data. In at least one embodiment, the performed simulation is an MC simulation. For example, simulation samples 550 are used as input data for a simulation as described with respect to FIG. 5B, and simulation results are analyzed for device modification and/or yield estimation as described with respect to FIG. 1.

In some embodiments, the sampling region determination at operation 605 includes one or more of the following operations.

At operation 635, probability distributions of a plurality of variables are divided into bins (or areas). In at least one embodiment, the bins divided from the same probability distribution have the same probability or width. For example, probability distributions 210, 230 are divided into a plurality of bins, as described with respect to FIG. 2.

At operation 645, intersections of the boundaries of the divided bins are identified as a plurality of check points. For example, check points (designated with the circle symbols) are determined at the intersections of the bins' boundaries, as described with respect to FIG. 2.

At operation 655, scores of the check points are determined. For example, an equation-based method is used to determine the scores of the check points, as described with respect to equations (2)-(6).

At operation 665, sampling constraints (or a boundary of the sampling region) are determined based on the scores of the check points. For example, the check points are sorted by the corresponding scores and the check points with the lowest scores are identified and used for determining sampling constraints, as described with respect to FIG. 4.

The above methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

Figure 7:
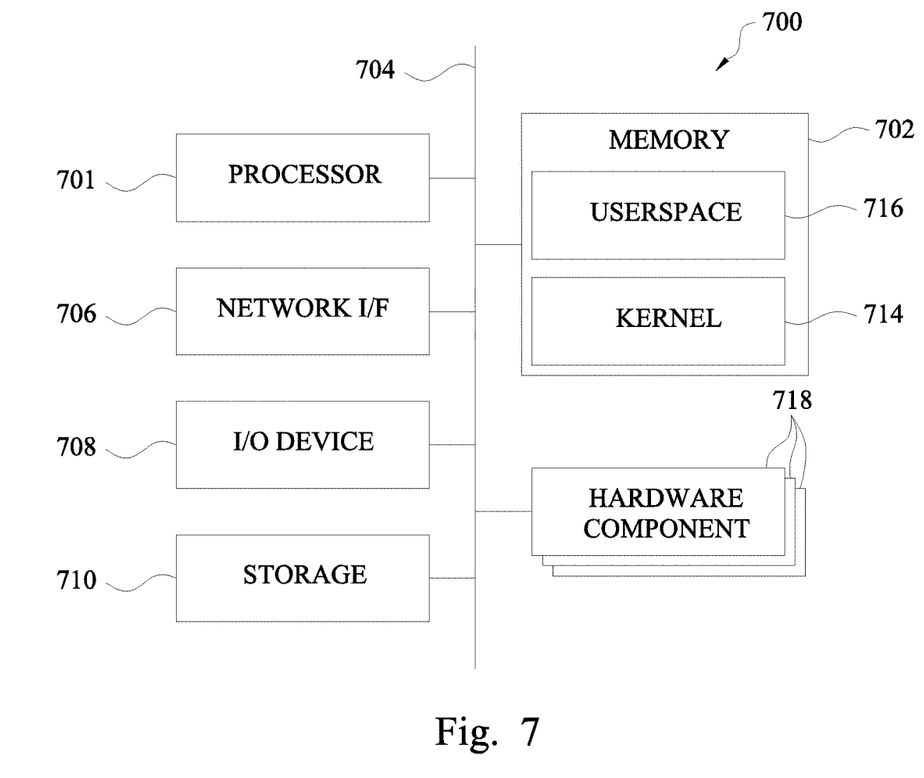
FIG. 7 is a block diagram of a computer system in accordance with some embodiments.

FIG. 7 is a block diagram of a computer system 700 in accordance with some embodiments. One or more of the tools and/or engines and/or systems and/or operations described with respect to FIGS. 1-6 is realized in some embodiments by one or more computer systems 700 of FIG. 7. The system 700 comprises at least one processor 701, a memory 702, a network interface (I/F) 706, a storage 710, an input/output (I/O) device 708 communicatively coupled via a bus 704 or other interconnection communication mechanism.

The memory 702 comprises, in some embodiments, a random access memory (RAM) and/or other dynamic storage device and/or read only memory (ROM) and/or other static storage device, coupled to the bus 704 for storing data and/or instructions to be executed by the processor 701, e.g., kernel 714, userspace 716, portions of the kernel and/or the userspace, and components thereof. The memory 702 is also used, in some embodiments, for storing temporary variables or other intermediate information during execution of instructions to be executed by the processor 701.

In some embodiments, a storage device 710, such as a magnetic disk or optical disk, is coupled to the bus 704 for storing data and/or instructions, e.g., kernel 714, userspace 716, etc. The I/O device 708 comprises an input device, an output device and/or a combined input/output device for enabling user interaction with the system 700. An input device comprises, for example, a keyboard, keypad, mouse, trackball, trackpad, and/or cursor direction keys for communicating information and commands to the processor 701. An output device comprises, for example, a display, a printer, a voice synthesizer, etc. for communicating information to a user.

In some embodiments, one or more operations and/or functionality of the tools and/or engines and/or systems described with respect to FIGS. 1-6 are realized by the processor 701, which is programmed for performing such operations and/or functionality. In some embodiments, the processor 701 is configured as specifically configured hardware (e.g., one or more application specific integrated circuits (ASICs)). One or more of the memory 702, the I/F 706, the storage 710, the I/O device 708, the hardware components 718, and the bus 704 is/are operable to receive instructions, data, design constraints, design rules, netlists, layouts, models and/or other parameters for processing by the processor 701.

In some embodiments, the operations and/or functionality are realized as functions of a program stored in a non-transitory computer readable recording medium. In at least one embodiment, the operations and/or functionality are realized as functions of a program, such as a set of executable instructions, stored in memory 702. In at least one embodiment, a cell library, is stored in a non-transitory computer readable recording medium for access by one or more operations as described herein. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

In some embodiments, simulation samples are generated, with constraints, to be concentrated in a sampling region of a sample space. Compared to other approaches where simulation samples are generated over the whole sample space and/or without constraints, at least one embodiment achieves one or more effects including, but not limited to, lower simulation time and/or cost, enhanced stability, and higher accuracy, without an increase in the number of simulation samples.

In some embodiments, a method comprises determining a sampling region in a sample space, generating samples in the sampling region without generating samples outside the sampling region, and simulating a performance of a device using the generated samples as input data. The sample space is defined by a plurality of variables associated with the device. Values of the plurality of variables in the sampling region having lower probabilities to meet a specification of the device than values of the plurality of variables outside the sampling region. The method is performed at least partially by at least one processor.

In some embodiments, a system comprises at least one processor configured to divide probability distributions of a plurality of variables into areas having boundaries, identify intersections of the boundaries as a plurality of check points, determine scores of the plurality of check points, determine sampling constraints based on the scores of the plurality of check points, and generate samples satisfying the sampling constraints as simulation input data.

In some embodiments, a computer program product comprises a non-transitory, computer-readable medium containing instructions therein which, when executed by at least one processor, cause the at least one processor to divide a first probability distribution of a first variable of a plurality of variables into first areas having first boundaries, and divide a second probability distribution of a second variable of the plurality of variables into second areas having second boundaries. The first areas have the same probability. The second areas have the same probability. The plurality of variables is associated with a manufacturing process of a semiconductor device. The instructions, when executed, further cause the at least one processor to identify intersections of the first boundaries with the second boundaries as a plurality of check points, determine scores of the plurality of check points, determine first and second sampling constraints corresponding to the first and second variables based on the scores of the plurality of check points, generate samples satisfying the first and second sampling constraints, and simulate a performance of the semiconductor device using the generated samples as input data. The first sampling constraint corresponds to one of the first boundaries, and the second sampling constraint corresponds to one of the second boundaries.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   determining a sampling region in a sample space, the sample space defined by a plurality of variables associated with a device, values of the plurality of variables in the sampling region having lower probabilities to meet a specification of the device than values of the plurality of variables outside the sampling region;
   generating samples in the sampling region without generating samples outside the sampling region;
   simulating a performance of the device, using the generated samples as input data;
   modifying a configuration of the device, based on a result of the simulated performance; and
   simulating a performance of the device having the modified configuration,
   wherein the method is performed at least partially by at least one processor.

2. The method of claim 1, wherein the plurality of variables includes variables of a manufacturing process of the device.

3. The method of claim 2, further comprising:
   estimating a yield of device manufactured by the manufacturing process, based on a result of the simulated performance.

4. The method of claim 1, wherein the determining the sampling region comprises:
   selecting a plurality of check points;
   determining scores of the plurality of check points; and
   identifying the sampling region based on the scores of the plurality of check points.

5. The method of claim 4, wherein the selecting the plurality of check points comprises:
   dividing probability distributions of the plurality of variables into areas having boundaries; and
   identifying intersections of the boundaries as the plurality of check points.

6. The method of claim 5, wherein the areas divided from the probability distribution of at least one of the plurality of variables have the same probability.

7. The method of claim 5, wherein the areas divided from the probability distribution of at least one of the plurality of variables have the same width.

8. The method of claim 5, wherein the plurality of variables includes variables of a manufacturing process of the device, said method further comprising:
   determining an acceptable number of samples that fail to meet the specification, based on a ratio between a total number of the divided areas and a number of the divided areas corresponding to the sampling region.

9. The method of claim 4, wherein the determining scores of the plurality of check points comprises:
   determining weight values of the plurality of variables; and
   calculating the score of each check point of the plurality of check points based on
      the determined weight values of the plurality of variables,
      values of the plurality of variables at the check point, and
      probabilities of the values of the plurality of variables at the check point.

10. The method of claim 9, wherein the determining the weight values of the plurality of variables comprises:
    performing a perturbation analysis.

11. The method of claim 4, wherein the identifying the sampling region comprises:
    identifying, among the plurality of check points, check points having the corresponding scores lower than a predetermined threshold; and
    defining a boundary of the sampling region based on the identified check points.

12. The method of claim 1, further comprising manufacturing the device having the modified configuration.

13. A system, comprising at least one processor configured to:
divide probability distributions of a plurality of variables into areas having boundaries;
identify intersections of the boundaries as a plurality of check points;
determine scores of the plurality of check points;
determine sampling constraints based on the scores of the plurality of check points; and
generate samples as simulation input data, the samples satisfying the sampling constraints.

14. The system of claim 13, wherein the at least one processor is configured to divide the probability distribution of at least one of the plurality of variables into areas having the same probability.

15. The system of claim 13, wherein the at least one processor is configured to divide the probability distribution of at least one of the plurality of variables into areas having the same width.

16. The system of claim 13, wherein the at least one processor is further configured to determine normalized weight values of the plurality of variables, in accordance with the following equations:

$$w_i^\pm = \frac{Perf_{(x_i=\mu\pm k\sigma)} - Perf_{(x_i=\mu)}}{\pm k\sigma}, \text{ and}$$

$$w_{i\_n}^\pm = \frac{w_i^\pm}{\max(|w_i^\pm|)}$$

where
$x_i$ is a value of an $i^{th}$ variable of the plurality of variables,
$\sigma$ is a standard deviation of the probability distribution of the $i^{th}$ variable,
$\mu$ is a mean value of the probability distribution of the $i^{th}$ variable,
k is a positive integer,
Perf is a performance function associated with the $i^{th}$ variable,
$w_i^\pm$ is a weight value of the $i^{th}$ variable before normalization, and
$w_{i\_n}^\pm$ is a normalized weight value of the $i^{th}$ variable,
$w_{i\_n}^-$ corresponds to $x_i<0$, $w_{i\_n}^+$ corresponds to $x_i\geq 0$.

17. The system of claim 16, wherein the at least one processor is further configured to determine the scores of the plurality of check points in accordance with the following equations:

$$\text{score}_j = P_j / \left(\sum_{i=1}^n x_{ij} \cdot w_{i\_n}^\pm\right),$$

$$P_j = \prod_{i=1}^n P_{x_{ij}}, \text{ and}$$

$$P_{x_{ij}} = P(a < x_{ij} \cdot w_{i\_n}^\pm < b),$$

where
$\text{score}_j$ is the score of a $j^{th}$ check point of the plurality of check points,
n is a number of the plurality of variables,
$x_{ij}$ is a difference between a value of the $i^{th}$ variable at the $j^{th}$ check point and the mean value $\mu$ of the probability distribution of the $i^{th}$ variable,
$P_j$ is a probability of the $j^{th}$ check point with respect to the plurality of variables,
$Px_{ij}$ is a probability of the $j^{th}$ check point with respect to the $i^{th}$ variable,
P is a probability distribution function describing the probability distribution of the $i^{th}$ variable, and
a and b are values of the $i^{th}$ variable at the boundaries of the divided area corresponding to $x_{ij}*W_{i\_n}^\pm$.

18. A computer program product, comprising a non-transitory, computer-readable medium containing instructions therein which, when executed by at least one processor, cause the at least one processor to
divide a first probability distribution of a first variable of a plurality of variables into first areas having first boundaries, each first area of the first areas has a same first area probability, the plurality of variables associated with a manufacturing process of a semiconductor device;
divide a second probability distribution of a second variable of the plurality of variables into second areas having second boundaries, each second area of the second areas has a same second area probability;
identify intersections of the first boundaries with the second boundaries as a plurality of check points;
determine scores of the plurality of check points;
determine first and second sampling constraints corresponding to the first and second variables based on the scores of the plurality of check points, the first sampling constraint corresponding to one of the first boundaries, the second sampling constraint corresponding to one of the second boundaries;
generate samples satisfying the first and second sampling constraints; and
simulate a performance of the semiconductor device, using the generated samples as input data.

19. The computer program product of claim 18, wherein the instructions, when executed by the at least one processor, further cause the at least one processor to
generate the samples without a sampling constraint on a third variable of the plurality of variables.

20. The computer program product of claim 19, wherein the instructions, when executed by the at least one processor, further cause the at least one processor to
determine weight values of the plurality of variables; and
calculated the scores of the plurality of check points, using the weight values,
wherein the weight value of the third variable is smaller than the weight values of the first and second variables.

* * * * *